May 16, 1944.  P. E. WAUGH  2,348,769
LIQUID DISPENSING MEANS
Filed April 11, 1939  4 Sheets-Sheet 1
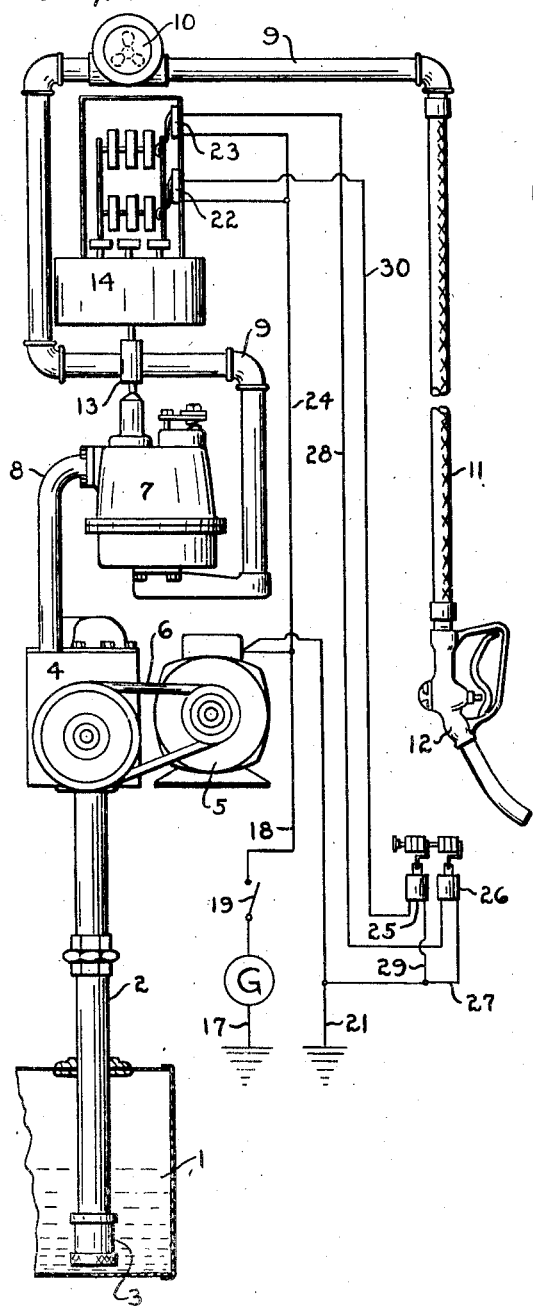
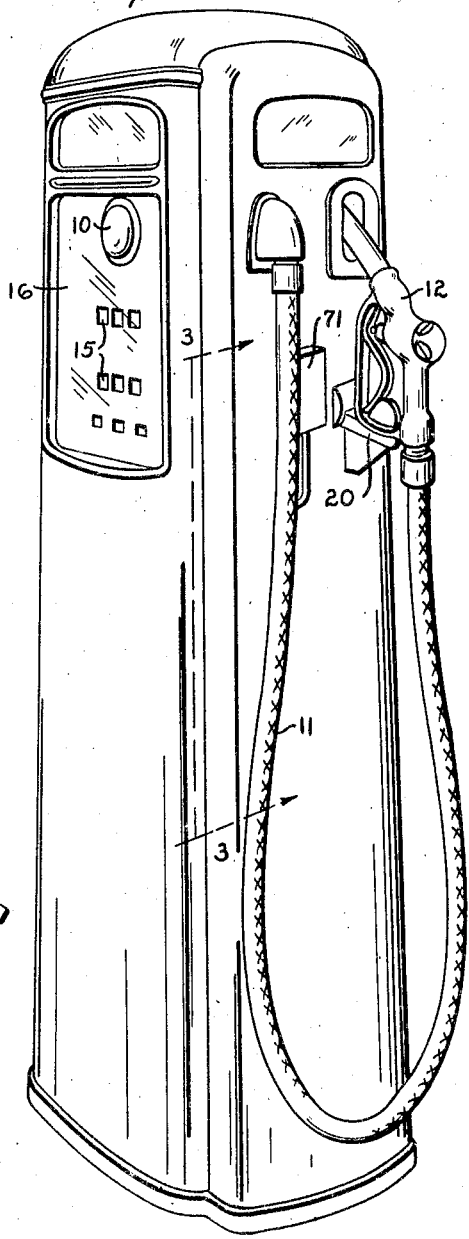
INVENTOR.
Paul E. Waugh
BY: Cox & Moore
ATTORNEYS.

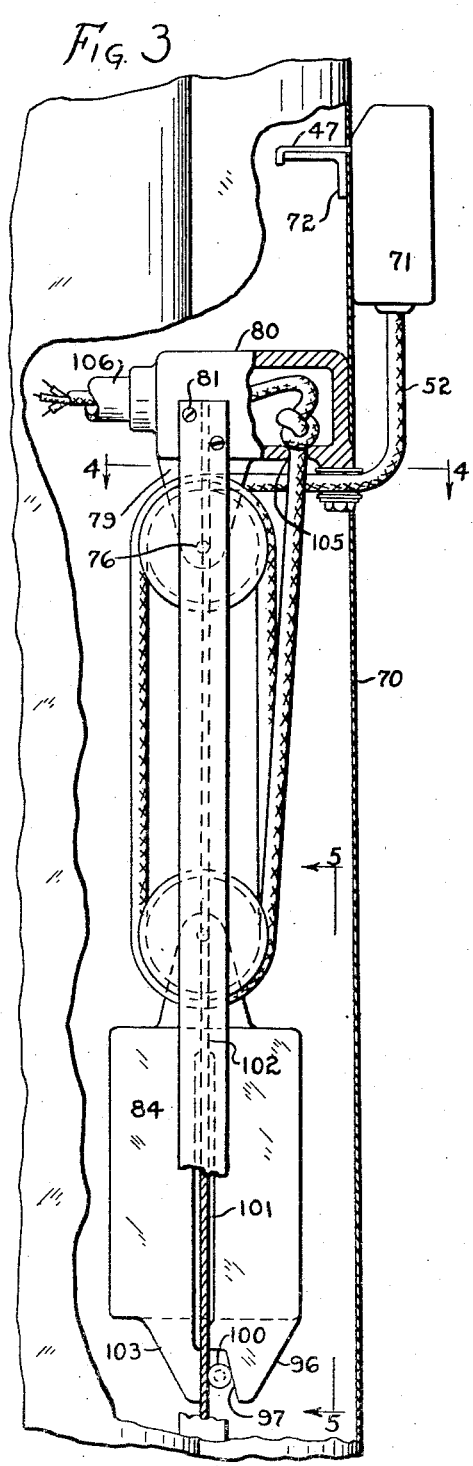

May 16, 1944.  P. E. WAUGH  2,348,769
LIQUID DISPENSING MEANS
Filed April 11, 1939  4 Sheets-Sheet 3
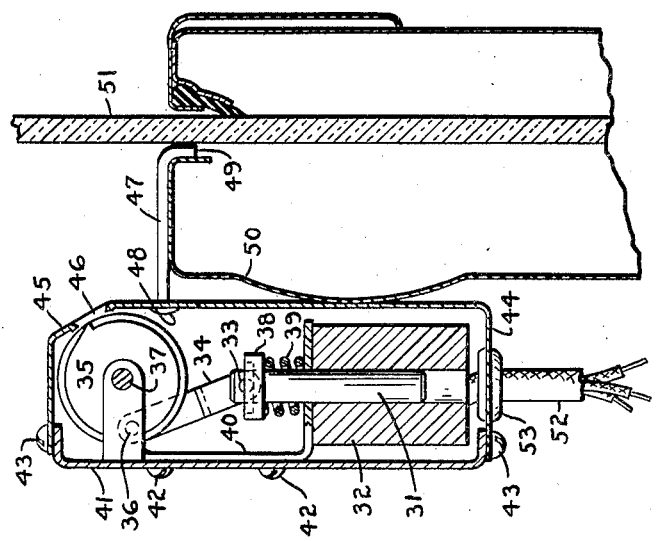
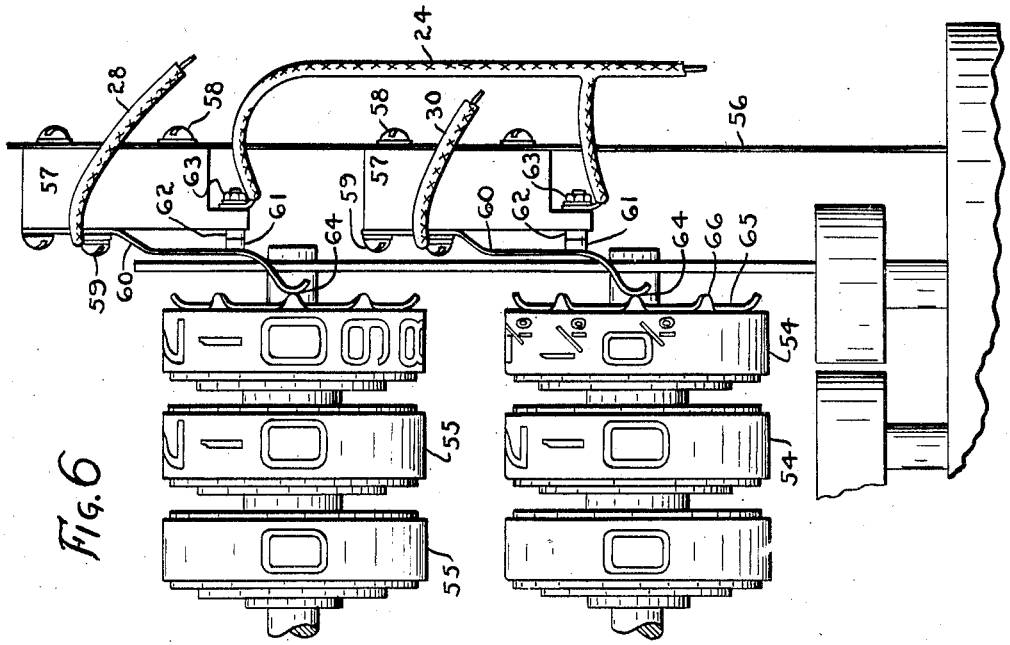
INVENTOR.
Paul E. Waugh
BY: Cox & Moore
ATTORNEYS.

May 16, 1944. P. E. WAUGH 2,348,769
LIQUID DISPENSING MEANS
Filed April 11, 1939 4 Sheets-Sheet 4
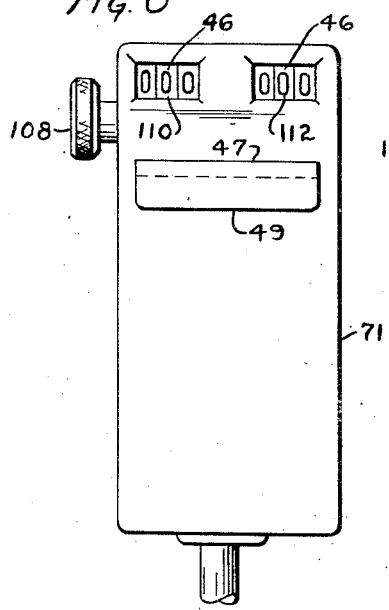
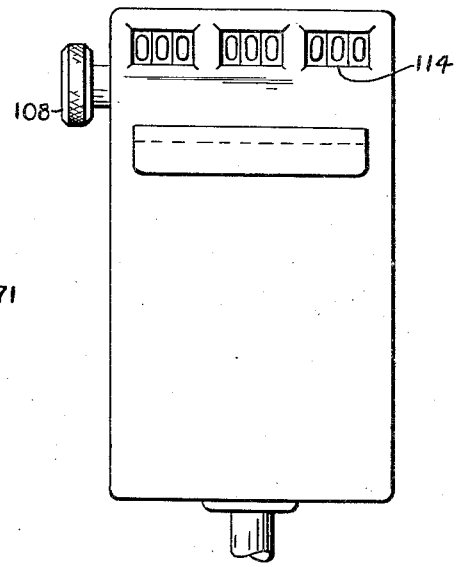
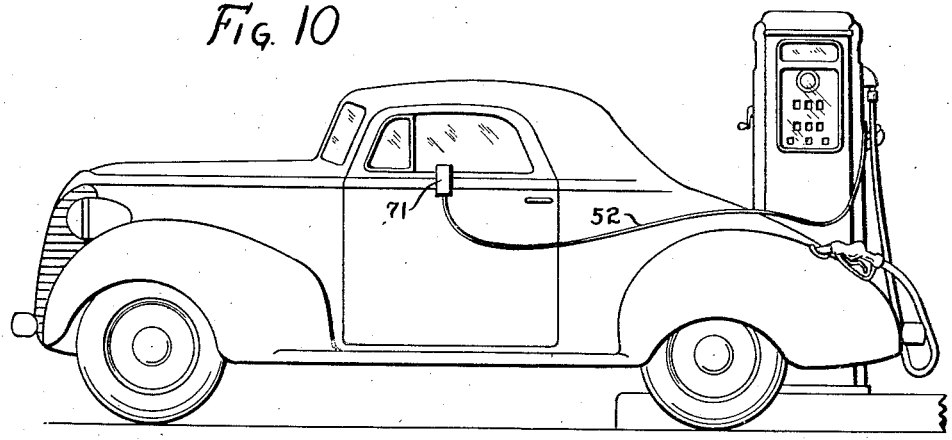
INVENTOR.
Paul E. Waugh
BY: Cox & Moore
ATTORNEYS Patented May 16, 1944

2,348,769

UNITED STATES PATENT OFFICE 2,348,769

LIQUID DISPENSING MEANS

Paul E. Waugh, Fort Wayne, Ind., assignor to Tokheim Oil Tank and Pump Company, Fort Wayne, Ind., a corporation of Indiana Application April 11, 1939, Serial No. 267,262

4 Claims. (Cl. 221—95)

This invention relates to liquid dispensing devices and more particularly to liquid dispensing devices of the type known as service station equipment pumps, wherein liquid fuel in use in internal combustion engines is dispensed, for filling the fuel tanks of automobiles and other automotive vehicles.

The conventional type of service station pump for filling the tanks of automobiles comprises an upstanding housing, generally located on an island, to either side of which automobiles may be driven and stopped with their fuel tanks within 10 feet, more or less, of the housing. Each housing includes enclosing dispensing mechanism including a dispensing line, which line terminates outside of the housing in a flexible hose provided with a dispensing nozzle, generally having a control valve thereon. These flexible hoses are approximately 10 feet long, so that any fuel tank of an automobile within a radius of 10 feet of the housing may be filled by the dispensing line. In addition, the modern type of service station pump is provided with opposed dials which compute the price and/or volume of the liquid being dispensed, the computing mechanism being driven preferably from the liquid displacement meter which is disposed in the flow line and is actuated by the flowing liquid as it is dispensed through the flow line. In many instances and in many installations, in the servicing of automobiles it is often difficult for the operator of the car to see the dials of the dispensing pump due to the fact that he must stop with the fill pipe of his supply tank, which is located in the rear of the car, directly opposite the pump. In this position, the customer, seated in the driving seat of the car is generally facing in the opposite direction from the pump and at a considerable distance away from the same. It therefore becomes necessary, if the customer-driver desires to see the amount being delivered or verify that the computer or counter has been reset to zero before the dispensing operation begins, for him either to get out of the car to see the pump or inconveniently to turn around to look at the pump dials while seated in the car.

The present invention has for its object the elimination of this inconvenience and the provision of means associated with the service station pump, whereby simultaneously with the filling of the fuel tank in the rear of the car by means of the flexible hose extending from the dispensing line and within the housing, an indicating device operatively associated with volume and/or price computing mechanism located in the housing, can be positioned directly opposite the driver-customer while he is sitting in the driver's seat of the automobile, whereby said driver, without inconvenience and without turning around, may not only verify the fact that the computing mechanism at the initiation of the dispensing operation starts at zero, but also may at all times watch the indicator to determine the volume and also price, if desired, of the liquid being dispensed; to provide a service station pump having the conventional type of computing mechanism and the conventional or any type of dispensing line with portable means for indicating at any instant the volume and/or price of the liquid being dispensed and wherein such portable indicating means is operatively connected to computing mechanism located within the housing and wherein such operative connections are extensile from and retractile within the housing, whereby the portable indicating means may be carried from the housing and operatively positioned remotely from the housing in any convenient position, irrespective of the position of the flexible filling hose of the dispensing line of the pump which has been inserted in the filling tank of the automobile; to provide a service station pump of the conventional type or any type having a plurality of volume and/or price computing devices, one of which devices is stationarily mounted on the housing of the pump and connected to internal mechanism within the housing for actuating same, and the other of which devices is operatively connected to such internal mechanism within the pump housing, but is portable relative to the pump housing; to provide a service station pump or other dispensing device for liquid fuel for internal combustion engines and the like having a housing enclosing the major portion of the dispensing apparatus and portable indicating means including a relatively small casing and connections therefrom to the operating mechanism within the pump housing whereby the portable indicating mechanism may be operated remotely from the pump housing in any position placed, the indicator casing having means whereby it may be positioned on the outside of the pump housing when not in use, and/or may be positioned on the door shell of an automobile where it may be conveniently observed during operation; to provide a service station pump having the usual or other type of liquid dispensing means inclosed therein, wherein the pump is provided with a flexible dispensing hose connecting with the dispensing line within the housing and wherein portable indicating means is provided adapted to indicate the volume and/or price of the liquid as it is being dispensed including relatively long, flexible operative connections from the indicating means to actuating mechanism therefor disposed within the housing, wherein means is located in the housing for automatically permitting the extension of the actuating connecting means from within the housing to locations remote to the housing and/or likewise to cause the automatic take-up of this extended operating means upon the completion of the dispensing, whereby the portable indicating means may be returned to the housing and positioned thereon when not in use; to provide means associated with the extensible and retractile operating mechanism for the portable indicator, whereby when the indicator is carried from the housing and positioned in any convenient location remote therefrom, there will be no tension placed upon the operating mechanism for the indicator during its operation; to provide means in association with extensible and retractile operating mechanism for the indicating means whereby on the termination of the indicating operation mechanism automatically operated from the remotely placed indicating means to initiate automatically the operation of the take-up mechanism whereby said connecting actuating means is automatically withdrawn into the housing; to provide a service station equipment pump including a housing having the usual flexible hose on the portion of the flow line extending therefrom and having any type of manually operable switch connection with the motor of the liquid forcing means of the pump, but wherein the housing is provided with one or more openings adapted to provide supporting means for a portable indicator and to provide means whereby extensile and retractile operating mechanism from within the housing and connecting to the portable indicator may pass through the housing whereby said portable indicator when not in use may be supported on the housing of the actuating mechanism, the operating mechanism being withdrawn within the housing; to provide in combination with a conventional type of service station pump a relatively small auxiliary indicator, synchronized electrically with the computing or counting mechanism of the pump and adapted operatively to be placed or attached in convenient view of the driver of the automobile so that he may at any moment determine the status of the dispensing operation; to provide such device constructed and arranged so that it may be attached on the side of the automobile for its support, or, alternatively, so that it may be provided with suitable stand or arm upon which it could be mounted independent of support on the car; to provide these and other objects of invention as will be apparent from a perusal of the following specification, when taken in connection with the accompanying drawings.

Referring now to the drawings in detail:

Fig. 1 is a somewhat schematic view of one type of dispensing apparatus embodying the present invention, and showing one form of wiring diagram;

Fig. 2 is a perspective view of a gasoline or service station dispensing pump showing the device attached as it would be normally supported when in idle position or not in use;

Fig. 3 is a sectional view of the pump as illustrated by lines 3—3 of Fig. 2. In this view a portion of the housing is broken away to show the internal structure of the pay-off and take-up means for the actuated connections between the indicator and computing mechanism within the housing.

Fig. 4 is a sectional view taken at line 4—4 of Fig. 3;

Fig. 5 is a view as indicated at line 5—5 of Fig. 3;

Fig. 6 is a view showing schematically the connections between the conventional type of computing wheels and electrical switches for operating the device;

Fig. 7 is a view showing the auxiliary indicator supported on the side of an automobile door, both being shown in section;

Fig. 8 is a view showing the front or side of the portable indicator as it is exposed to the customer for exhibiting the counter for indicating both the amount of gasoline and the total cost of the transaction;

Fig. 9 is a modified form showing the method of incorporating the registering means to indicate the value per unit of quantity of liquid being dispensed, such, for instance, as the cost of a gallon of gasoline in cents and tenths of a cent; and Fig. 10 is a view showing the method of utilizing the device as it would be employed in connection with a conventional service station pump when servicing a customer's car.

Referring now to the drawings in detail, and particularly to Fig. 1, which shows any type of gasoline pump, such, for instance, as the present conventional type of pump, an underground supply tank 1 has extending therefrom the suction end of the dispensing line 2, there being the usual foot valve or line valve 3 which permits the liquid to flow upwardly while preventing its return therethrough. The upper end of this suction pipe 2 is attached to the inlet side of a liquid pump 4 of any desired construction, driven by an electrical motor 5 by means of a belt or other driving means 6. The liquid is drawn upwardly by the pump and forced through the liquid displacement meter 7 by pipe 8 and leaves the meter through the discharge pipe 9. Incorporated within the system is the usual sight gauge 10. All of the foregoing instrumentalities, except the underground tank and a part of the pipe 2 are disposed within the upstanding housing hereinafter referred to. Attached to the outside of the housing to the conduit 9 forming the dispensing line is the conventional type of flexible hose 11 provided with the conventional type of associated nozzle. The nozzle generally embodies a nozzle control valve for controlling the dispensing system but other types of controls may be substituted. Driven from the meter shaft 13 is computing and counting mechanism 14. Numerals of this computer are visible through the openings 15 in the housing as shown in Fig. 2, and the computer dial 16. These dials are located on opposite faces of the housing. The indicating mechanism shown is preferably of the computing type and comprises dials showing the volume of liquid being dispensed, the total cost of such volume of liquid and the unit price per unit of gallon.

Associated with the housing of the enclosed dispensing mechanism is any type of power source, such as a generator G illustrated in Fig. 1, which is connected in the circuit by wires 17 and 18. In the line 18 is shown control switch 19, which is normally controlled by a lever extending outside of the pump and upon which the nozzle rests as indicated at 20. This pump motor control lever or switch may have many different arrangements, preferably in association with the nozzle support, whereby, if desired, the arrangement may be such that the nozzle may not be placed upon its support unless the pump switch is thrown to a non-operative position, thereby insuring that, when the nozzle is locked up for the night, it will be necessary first to throw the pump switch to non-operative position. The other side of the circuit through the motor is indicated by wire 21. Attached to the side of computer 14 are two switches indicated in general at 22 and 23, an extension of wire 18 as in 24 is connected to both switches 22 and 23 as shown in Fig. 6. Two solenoids are shown in Fig. 1 at 25 and 26. Solenoid 26 is connected to the wire 21 by the wire 27 and to the upper switch by wire 28. The solenoid 25 is connected to the wire 27 by means of the wire 29, and the other side is connected to the switch 22 by wire 30.

A portable counting mechanism is associated with each housing and is operatively connected to the computing mechanism within the housing by means of extensile and retractile operating means of flexible nature and means is provided within each housing whereby automatically the portable indicating mechanism may be carried to a point or location remote from the housing and positioned to be viewed and/or may automatically be returned and wound up or operatively arranged within the housing with the indicator supported on and/or adjacent to the housing. The details of constructions of the portable indicator are best shown in Fig. 7. This view shows a solenoid core 31 disposed within its windings 32. Attached to the end of this core by a pin 33 is a connecting link 34, connected to a ratchet and attached to counter 35 by means of a pin 36. This counter or indicating means, or, as a matter of fact, both counters are radially mounted on the center shaft 37. The collar 38 is disposed about the end of core 31, and has a compression spring 39 located at the rear of the solenoid support 40. The support bracket 40 of the solenoid is shown as being attached to a conduit plate 41 by means of screws 42. Attached to this base plate 41 by means of screws 43 is a conduit housing or casing 44. At its upper right hand corner this housing is provided with an angularly disposed face 45. In this angularly disposed face are one or more openings 46, which may be for any of the counter wheels. Attached to the cover plate 44 is a laterally extending arm 47, securely attached thereto by means of welding or riveting as at 48. The end of the arm or bracket 47 has a downwardly turned edge as at 49, to be disposed between the door glass 51 and the door shell 50 for supporting the counter or indicating means on the outside of the automobile door, directly opposite the driver's seat where it may be conveniently viewed by the driver. A covered electrical cable as 52 is shown broken off as it leaves the housing 44 through a rubber insulating ring 53. Three wires are shown being enclosed in this electrical cable. This electrical cable extends from the portable indicator, for which the housing is shown in Fig. 3, where it is associated with payoff and take-up mechanism hereinafter described.

In Fig. 6 a portion of the computing mechanism is shown as located in the housing and provided with three lower counting wheels 54 for registering and indicating the number of gallons and fractions of gallons being dispensed. Above these are shown three additional single wheels 55 for indicating the total value of the liquid being dispensed at any particular instant. The right hand wheel 54 registers tenths of a gallon and makes one complete revolution for each gallon of liquid dispensed, while the right hand wheel 55 registers the units of cents and makes one revolution to every value of 10 cents dispensed.

The switches which are about to be described are shown for the sake of illustration. In actual practice these switches would necessarily be enclosed in some type of closed conduit required by the wiring regulations of the states and localities. The support 56 of the computer has insulating material blocks 57 attached by screws 58. On the opposite side of these blocks and attached by screws 59 are spring-like leaves 60. Attached in some rigid means to the leaves 60 are contacts 61, cooperating with similar contact points 62, attached by means of the screw and nut 63 to the blocks 57. On the lower ends of the spring 60 is provided a cam-like portion 64. Securely attached to the wheels 54 and 55 is a disk 65 having outwardly turned points or lugs 66. These points rotate with their respective wheels and operate the spring in repeated transverse movements. In the movements of these springs as each point 66 forces the spring 60 down by contact with the portion 64, the contact points 61 and 62 are forced together. Wire 28 is attached by the screws 59 to the upper leaf 60, and wire 30 is attached to the lower leaf 60 in the same fashion.

In Figures 3 to 5 I have shown the method of housing the electrical operating connections 52 within the housing 70. The counter or portable indicating means generally indicated at 71 is shown in its normally retained position by supporting base 47 passing through a slot in the housing 70 and passing over a small flange 72 attached to the inside portion of the housing 70 by spot welding. The cable or flexible operating connections for the portable indicator leads into the housing between two small sheaves 73 as shown in Fig. 4. These are guiding or protecting sheaves which are free to rotate on their spindle 74 and these protect the cable during its taking-in or paying-out operations. The cable passes inwardly and over a sheave 75 which is freely mounted upon a spindle 76. On this same spindle 76 is also mounted two other sheaves 77 and 78, the whole unit being supported by a web 79, extending downwardly from an electrical connection box 80. This connection box 80 is rigidly supported within the housing and has attached to its sides by means of screws 81 two T iron guides 82. These T iron guides are mounted vertically in the housing and the center arms 83 thereon serve as guides for a weight 84. The weight and its associated parts are best shown in Figs. 3 and 5. Extending upwardly from the top portion of the weight is a supporting bracket having fastened at its end a shaft 85 (see Fig. 5) upon which two sheaves 86 and 87 are free to rotate. To the right hand side of the weight is located another sheave 88 mounted in a yoke 89 on a pin 90. This yoke is attached to the rod or pin 91 and the rod extends vertically through an opening in the weight and connects to a lever 92 located below the weight. This lever 92 is pivoted at 93 on the extended, supporting boss 94, and the lever is constantly forced in a clockwise direction by the spring 95. On the left hand side a boss 96 extends downwardly from the weight and has a cam-like face 97 on its inward side. The lever 92 has an outwardly turned face 98 to which is attached a pin or stud 99 which supports the roller 100. On each side of the weight 84 a groove extends lengthwise to accommodate the inner arms 83 of the T iron guides 82. These grooves are relieved as at 101 and the only contact which the weight has with its guides are at its extreme ends as at 102, thereby reducing friction. Oppositely disposed from the lug 96 is a bracket 103. At the rear side of the boss 94 a lug 104 (see Fig. 5) serves as a stop for the lever 92.

Cable 52 enters through the housing as shown in Fig. 4, passes over the sheave 75, extends downwardly and about sheave 88, thence upwardly again to the next sheave 77, making another cycle down about sheave 86 and upward to sheave 78. The cable thence extends in another cycle downward about sheave 87 (see Fig. 5) and back upwardly to the connection box through an opening 105. A knot is shown tied in the cable within the connection box to support the upper end of the cable and prevent it from being pulled out of the connection box. Electrical wiring within the cable leaves this connection box as at 106 and from thence is extended to the computer switches as shown in Fig. 6.

Operation

Referring now to the operation of the above-described apparatus, when a customer drives up to a service station pump embodying the features of the present invention, illustration of which is shown in Figure 10 of the drawings, the driver of the car generally stops the automobile with his fill tank directly opposite the pump. Inasmuch as the fill tank is generally located in the very rearmost portion of the automobile, and since sometimes the fill tank is on that side of the car farthest away from the pump, the driven sitting in the driver's seat will have his face, as he sits in the seat, in a direction away from the pump, so that he is unable to see the dials of the computing mechanism of the pump. With the present invention the operator or attendant will accordingly remove the indicator or counter 71 from its support on the housing, pulling out the flexible actuating connection 52, and will place the indicator 71 on the side of the customer's door, as shown in Figures 7 and 10. In this position the supporting mechanism 47 on the casing of the portable indicator will overlie the shell 50 of the door, the down turned lip 49 of the supporting apparatus 47 entering between the door shell and the glass panel 51 of the door. In this position the driver, sitting in his seat, can readily view the counter wheels 35 of the indicator mechanism, as they will be directly opposite his eyes as he sits in the seat. The operator then removes the dispensing nozzle from its support on the side of the housing, which removal, due to the conventional type of interlock utilized between the computer resetting means and the conventional type of switch lever, must necessarily cause the resetting of the computer. The operator then is enabled to lift the switch lever 20 which action automatically closes the switch 19 to the motor circuit that drives the pump 4. The counter wheels are then put in the position shown in Figure 6, to-wit: at 0, and the contact points 61 and 62 will be held closed. This position of the contact points energizes the solenoids 25 and 26 by means of their electrical hookup with the motor circuit. As thus energized, the cores 31 of these solenoids will be drawn within their windings and in turn will draw the links 34 to their extreme downward positions. On the side of each counter indicator is disposed a reset knob 108 for resetting the small counter wheels to 0. The counters here employed may be of any type, and in fact insofar as the broad aspects of the invention are concerned, the counter actuating mechanism may be of any type. I have shown the present type merely for purposes of illustration. The counter wheels of the pump being in 0 position and also the small counter wheels of the portable indicator being at 0 position as liquid is dispensed from the nozzle 12 to the customer's car, the meter 7 in its actuation by the liquid flow therethrough registers on the counter wheels 54 by means of the shaft 13 the amount of liquid being dispensed. At the same time the counter wheels 55 will be registering the value of that liquid being dispensed.

Both the wheels 54 and 55, as they rotate with their associated disc and points 65 and 66, cause a momentary circuit to pass between the points 61 and 62 as each such points 66 passes extended arms 64. Thus as soon as wheel 54 and the point opposite 0/10 moves downwardly, the spring 60 will move outwardly to the left and break the circuit through the contacts 61 and 62. The solenoid then will become de-energized and the core 31 will be forced outwardly by spring 39. The ratchet mechanism associated with the arm and link 34 will be moved forward 1/10 of a revolution of the small counter wheels 35. When the point 66 opposite the 1/10 mark on the counter wheel 54 contacts the cam 64, the circuit will be closed through the contact points 61 and 62 again, which will again energize the solenoid and again pull its core and actuate link 34 and ratchet mechanism not shown, together with the tenths of a gallon wheel 35, toward 1/10 of a revolution. Thus it can be seen that this cycle or this operation will continuously occur as each point on the counter wheels passes the spring extended arm 64, thereby causing interrupted circuit between the contact points 61 and 62. The computer whels 55 and their associated parts operate a counter exactly like the one described hereinbefore and shown in Figure 7 for registering the cost or value of the liquid shown on the volume counter. In Figure 8 numerals 110 may register the gallon delivery while the numerals 112 may register the value in dollars and cents.

When the amount of gasoline has been dispensed which the customer desired, it will show upon its counter 71 as well as upon the counting mechanism and computing mechanism visibly through the openings 15 of the pump dial housing. Then when the customer has been serviced the attendant may remove the counter 71 from the customer's car and by placing tension on cable 52 which is directly connected to the sheave 88 of the weight, this weight will be slightly lifted.

When the portable indicator was first removed from its housing and placed upon the customer's car, the cable 52 was pulled out of the housing. This drawing out of the cable to the customer lifted the weight 84 to a higher position. After the attendant had lifted the weight sufficiently to unlock the roller 100 from between the cam face 97 and the guide 83, the weight was thereafter lowered keeping a slight tension on the cable. The various sheaves on the weight and those positioned at the connection box operate on the principle of block and tackle. Thus when the cable was drawn from within the housing in the first instant the extra exerted force on the sheave 88 due to the pull on the cable 52 together with its rod 91 acted against the spring 95 to compress it. The lifting of the rod 91 and the compressing of the spring 95 caused the right-hand side of the lever 92 to raise slightly, this automatically moved the opposite end having the roller 100 attached thereto downwardly. When the cable 52 had been drawn out to the necessary required length, a quick releasing of the tension on the cable caused the spring 95 to act and to in turn force the roller 100 into wedging position as shown in Figure 3. Thus this wedge and roller provided a simple and rigid lock for the weight or cable at any time to thereby remove tension from the electrical cable or flexible actuating connections 52 when the counter or indicator was thus in remote position and in use.

When it was necessary to return the indicator to the housing, as heretofore stated, a slight pull was exerted on the cable which served to lift the weight 84 slightly, sufficiently to unlock the roller 100 from the cam face 97 and the guide 103, whereupon the weight will lower and keep a slight tension on the cable until the cable is withdrawn into the housing in operating position for a subsequent withdrawal.

In Figure 9 I have illustrated a modified form of the counter 71, the only difference being that another set of wheels or numbers 114 are shown for indicating to the customer the cost per gallon or per unit of liquid being dispensed. These wheels are not attached to the reset knob 106 but can only be changed by removing the outer cover by some means preferably that the attendant can perform and which the customer cannot.

Having thus described my invention, what I claim is:

1. In a liquid dispensing apparatus, a housing, a dispensing line having a portion enclosed in said housing and a flexible hose portion outside of said housing for dispensing the liquid, a meter within said housing and in said line, means in said housing and operated by said meter for registering a function of the liquid as it is being dispensed, portable means for simultaneously registering an identical function of the liquid as it is being dispensed, a cable connecting said portable registering means to said registering means within the housing, means for supporting the cable in the housing to yield the cable when tension is applied to the cable and to retrieve the cable into the housing when the tension is relaxed whereby to permit the portable registering means to be positioned remotely from said housing and actuated simultaneously with the registering means in the housing, and means for preventing retrieving of the cable during dispensing when extended and tension is relaxed on the cable.

2. In a liquid dispensing apparatus, a housing, a dispensing line having a portion enclosed in said housing and a flexible hose portion outside of said housing for dispensing the liquid, a meter within said housing and in said line, means in said housing and operated by said meter for registering a function of the liquid as it is being dispensed, portable means for simultaneously registering an identical function of the liquid as it is being dispensed, a cable connecting said portable registering means to said registering means within the housing, means for supporting the cable in the housing to yield the cable when tension is applied to the cable and to retrieve the cable into the housing when the tension is relaxed whereby to permit the portable registering means to be positioned remotely from said housing and actuated simultaneously with the registering means in the housing, and means for maintaining said flexible actuating cable in extended position without retrieving tension, said maintaining means including means automatically releasable by a pull exerted on the cable to permit the retrieving tension to be reapplied to the cable and the cable to be retrieved in the housing.

3. In a liquid dispensing apparatus, a housing, a dispensing line having a portion within the housing and a flexible portion outside of the housing for dispensing the liquid, measuring means in said housing and in said dispensing line and operable by the flow of liquid through said line, a register stationarily mounted in said housing, a portable register, a flexible actuating cable connected to the portable register and to the stationary register for operating the portable register by the stationary register and simultaneously therewith, relatively shiftable sheaves within said housing and about which said cable extends and from which it extends out of the housing, said sheaves being shiftable toward each other upon tension exerted on the cable to yield the cable from the housing to permit the portable register to be positioned at any desired point remote from the housing, weighted means for moving said sheaves relatively away from each other to retrieve the cable, an automatically operable lock for rendering said weighted means ineffective to retrieve the cable when extended and means automatically operable by tension exerted on the cable for releasing said locking means to permit retrieving of the cable.

4. In a liquid dispensing apparatus, a housing, a dispensing line having a portion within the housing and a flexible portion outside of the housing for dispensing the liquid, measuring means in said housing and in said dispensing line, a register stationarily mounted in said housing and operable by movement of said register, a portable register, a flexible actuating cable connected to the portable register and to the stationary register for operating the portable register by the stationary register and simultaneously therewith, relatively shiftable sheaves within said housing and about which said cable extends and from which it extends out of the housing, said sheaves being shiftable toward each other upon tension exerted on the cable to yield the cable from the housing to permit the portable register to be positioned at any desired point remote from the housing, automatic means for moving said sheaves relatively away from each other to retrieve the cable, an automatically operable lock for rendering said retrieving means ineffective when the cable is extended, and a relatively shiftable connection between one of said sheaves and said lock for releasing said lock upon a pull exerted on the cable to permit retrieving of the cable.

PAUL E. WAUGH.